United States Patent [19]

Bobillon

[11] 4,315,771

[45] Feb. 16, 1982

[54] PROCESS TO CONTINUOUSLY DETERMINE THE PROFILE OF A CHARGE FED INTO A BLAST FURNACE

[75] Inventor: Jean-Paul Bobillon, Metz, France

[73] Assignee: Institut de Recherches de la Siderurgie Francaise, Saint-Germain-en-Laye, France

[21] Appl. No.: 116,802

[22] Filed: Jan. 30, 1980

[30] Foreign Application Priority Data

Jan. 31, 1979 [FR] France .................................. 79 02830

[51] Int. Cl.³ ................................................ C21B 7/24
[52] U.S. Cl. .......................................... 75/41; 266/99; 356/376; 358/101; 358/107; 358/100
[58] Field of Search ....................... 75/41, 42; 358/100, 358/101, 106, 107; 356/376; 266/99

[56] References Cited

U.S. PATENT DOCUMENTS 3,364,012 1/1968 Noel .................................... 266/99 X
3,544,710 12/1970 Poos ..................................... 358/100
3,588,067 6/1971 Shimotsuma et al. ............... 266/197

FOREIGN PATENT DOCUMENTS 2847604 3/1979 Fed. Rep. of Germany .......... 75/41

Primary Examiner—M. J. Andrews
Attorney, Agent, or Firm—Michael J. Striker

[57] ABSTRACT

A process to continuously determine by an optical arrangement the profile of a charge fed into a blast furnace in which the surface of the charge is swept by a beam of light moving in a plane intersecting the surface so as to produce at the intersection of the plane with the surface a luminous trace, observing the luminous trace from a point outside the sweeping plane, and determining on the basis of the data defining the sweeping plane, the observation point and the direction of observation with respect to the plane the true position of the points constituting the luminous trace; and an apparatus for carrying out the process and including an illuminating system for illuminating the surface of the charge with a beam of light sweeping in a plane intersecting the surface to produce on the surface a luminous trace and a reception system cooperating with the illumination system for producing a picture of the actual profile of the luminous trace.

4 Claims, 1 Drawing Figure

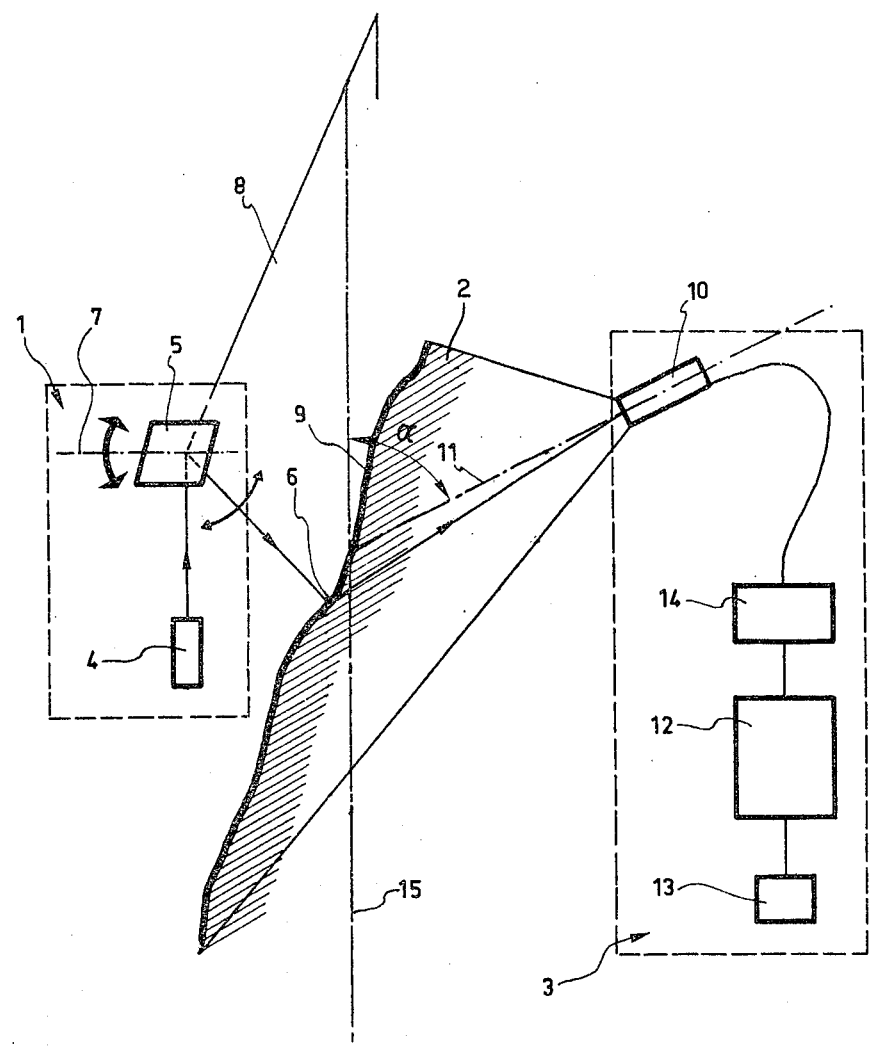

PROCESS TO CONTINUOUSLY DETERMINE THE PROFILE OF A CHARGE FED INTO A BLAST FURNACE

BACKGROUND OF THE INVENTION

The present invention relates to a method and apparatus for operating a metallurgical blast furnace or, more precisely, to continuously determine the profile of the charge at the mouth of the blast furnace.

As is known the operation of a metallurgical blast furnace depends especially on the gaseous distribution in the interior of the charge.

It is likewise known that this distribution depends essentially on the manner of regulating the charge of the material which is performed in modern blast furnaces especially equipped with impact rings of variable geometry or with movable charging chutes, which constitute means to regulate the charge. However, experience has shown that it is difficult to foresee precisely, even with the help of models or mock-ups the way the charge proceeds, that is the profile and local thickness of successive layers of the charge or the speed at which the latter descends. For this purpose it seems therefore essential to be able to determine "in situ" the profile of the charge at the mouth of the blast furnace.

Various attempts have already been made to solve this problem. For instance, there is known an arrangement with a mechanical probe, or a system for triangulation by means of gamma rays, or a luminous beam sweeping the surface of the charge.

Mechanical probes which are vertically lowered up to the surface of the charge present, however, certain inconveniences. Especially, it is only possible to obtain punctual measurements separated in time and space from each other. In addition, the automatization of such a probe is not at all easy and requires considerable maintenance cost.

On the other hand, the method using gamma rays cause especially difficulties of placing a radioactive source at the point of utilization.

The optical methods appear in principal the most satisfactory methods since they are inoffensive and since they permit a continuous functioning. Furthermore, it is possible to install all the necessary material for carrying out the method at the exterior of the blast furnace, which facilitates the maintenance.

Nevertheless, these methods seem up to now not to have been developed in a manner as could be expected. As far as applicant knows only some tentative methods have been developed, which are based in particular on the determination of the length of the incident beam, which presents certain inconveniences, such as the necessity of treating the received signal while taking into consideration the position of the emitter and the direction of the incident beam.

SUMMARY OF THE INVENTION

It is an object of the present invention to conveniently establish by optical means the profile of the surface of the charge, especially while resorting in the least possible manner to the geometric characteristics of the illuminating system.

With these and other objects in view, which will become apparent as the description proceeds, the process according to the present invention to continuously determine by optical means the profile of a charge fed into a blast furnace mainly comprises the steps of sweeping in a preferably vertical plane the surface of the charge with a beam of light so as to produce at the intersection of this plane with the surface a luminous trace, observing the luminous trace from a point outside the sweeping plane, and determining on the basis of the data defining the sweeping plane, the observation point, and the direction of observation with respect to the plane the true position of the points constituting the luminous trace.

The invention likewise includes an apparatus for carrying out the method and this apparatus mainly comprises a system for illuminating the surface of the charge with a beam of light sweeping in a vertical plane in order to produce on this surface a luminous trace, and a reception system comprising a fixed optical receptor means observing the trace from a direction including an angle greater than zero with the sweeping plane and producing signals in accordance with the image of the luminous trace observed, means cooperating with the receptor means for determining on the basis of the signals produced by the latter the spatial coordinates of successive points constituting the luminous trace, and means cooperating with the last mentioned means for producing on the basis of the coordinates a picture of the actual profile of the luminous trace in the sweeping plane.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing schematically illustrates an apparatus for carrying out the process to continuously determine the profile of a charge fed into a blast furnace.

DESCRIPTION OF THE PREFERRED EMBODIMENT

Referring now to the drawing, it will be seen that the apparatus according to the present invention comprises an illuminating system 1 for illuminating the surface of the charge 2 fed into a blast furnace and a reception unit 3 for receiving the image and for producing the actual profile of the charge.

The assembly is placed at the elevation of the mouth of a metallurgical blast furnace not shown in the drawing, but the axis of which is referred to with reference numeral 15. Two portholes are provided in a shield at the mouth of the blast furnace above the elevation of the surface of the charge 2, one of which is provided for the illumination system and the other for the observation.

The illumination system 1 may comprise a fixed light source 4 and a mirror 5 turnable about an axis 7 place opposite one of the portholes and reflecting across the latter a beam of light emanating from the source 4 towards the surface of the charge 2. The zone of impact of this light beam onto the surface of the charge 2 is presented in form of an illuminated spot designated with the reference numeral 6. By turning the mirror 5 about its axis 7, the light beam produces a sweeping plane 8 normal to the axis 7 of the mirror and the intersection of the sweeping plane 8 with the surface of the charge 2 produces a light trace 9 corresponding to the path traveled by the spot 6.

The receiving system 3 comprises a fixed television camera 10 located opposite the second porthole and having a field of vision large enough to cover the total of a diameter of the mouth of a blast furnace at the elevation of the surface of the charge, a unit 12 of known construction for electronically treating the television signal delivered by the camera and determining the spatial coordinates of the movable spot 6 during its movement on the basis of a predetermined position of the sweeping plane 8, the position of the camera 10 and the orientation of its axis 11 with regard to the plane 8. The receiving system includes further perceiving means 13, for instance a tracing table or a cathode tube which produces on the basis of the spatial coordinates calculated by the treating unit 12, a picture of the actual profile of the surface of the charge in the sweeping plane 8.

According to a modification of the present invention a supplementary perceiving apparatus 14 is interposed between the camera 10 and the treating unit 12, such as a television screen which permits to view the profile of the charge on a plane normal to the axis 11 of the camera.

According to an advantageous feature of the present invention, the treating unit 12 has the complementary function to determine the distribution of the thickness of the layers and the descending speed of the charge fed into the mouth of the furnace. In this respect it is mentioned that two successive sweeping operations, one just before feeding a charge in the furnace and the other immediately thereafter, will permit by comparison to determine the distribution of the thickness of a layer.

Likewise, the comparison of two sweeping operations carried out between two successive charging operations during a known time interval will permit to determine the speed at which the charge descends.

It is to be understood that by an appropriate command to the treating unit 12, the determination of these two parameters can be only local, for instance by considering only one point of the profile the elevation of which varies, whereas the other two coordinates have fixed values chosen in advance.

The calculated value of these two parameters may advantageously be shown on the means of perception 13.

In the following the position and the orientation of the receptor 10 with regard to the sweeping plane 8 is outlined.

The sweeping plane 8 may be vertical or obliquely inclined.

As a general rule the plane is vertical so that the luminous trace 9 will represent the profile of the charge 2 as usually understood, that is along the line of intersection of the surface of the material fed into the furnace with a plane parallel to the axis of the furnace mouth.

Nevertheless, it it also possible to orient the aforementioned plane inclined to the vertical especially in order to eliminate hidden zones of said charge which are difficult to reach otherwise. There are also other reasons for using a plane inclined to the vertical, which will be explained in the following. The intersection of the plane 8, be it vertical or oblique, with the surface of the charges 2, which defines as explained above the luminous trace 9, may be made along a diameter, that is passing through the axis 15, or along whatever chord of a circle determined by the intersection of the surface of the charge 2 with the wall of the mouth of the blast furnace.

Usually, it is sufficient to produce on the surface 2, a diametrical trace 9. In fact, the known systems of charging material into blast furnaces produce a substantially circular distribution of the material, so that the knowledge of the profile along one diameter of the furnace mouth is in most cases sufficient.

It is, however, possible, according to one way of carrying out the invention, to provide on the surface 2 a plurality of luminous traces 9 defining a family of chords having a point moving along the circumference of the above-defined circle and meeting at a fixed point on a vertical of the mirror 5. As far as the position of the receptor 10 is concerned, it is an important characteristic of the present invention that the receptor 10 is not placed in the sweeping plane 8. Otherwise the quantity of information received by the receptor would be substantially reduced since the luminous trace 9 would present at best only a monodimensional image. This image is actually received in the form of a straight segment the apparent length of which is the more reduced as the direction of observation, that is the axis 11 of the television camera 10, is moved away from the vertical. It would thus be very complex to reconstitute with an acceptable precision the actual profile of the surface of the charge. The restrictive conditions which have been brought out are the only conditions to be satisfied in order to carry out the invention.

Nevertheless, for an optimal utilization of the invention, attention is called to the following complementary conditions.

Considering what has been stated above, it will be understood without difficulty, that in the interest of the fidelity of the received image, it is advisable to place the receptor 10 in such a manner that its optical axis 11 includes with a sweeping plane 8 an angle which approaches as far as possible 90°.

This relative angular orientation can be defined by the angle between the sweeping plane 8 and the projection of the optical axis 11 onto a vertical plane passing through this axis and being perpendicular to the sweeping plane 8.

This relative orientation could also be defined as an angle between the sweeping plane 8 and a vertical plane intersecting the sweeping plane and including the optical axis 11.

This angle is referred to with letter $\alpha$ in the drawing.

Nevertheless, an additional parameter has to be taken into consideration, that is the illuminous energy dissipated in the direction of the observation.

It will be understood that in view of the sensibility of the receptor 10, the visibility of the luminous trace 9 depends on this parameter. For this purpose, it will be evident that it is advantageous to place the receptor 10 into the plane of reflection of the light and symmetrically to the sweeping plane 8 with reference to a line perpendicular to the illuminated region of the surface of the charge.

It appears, therefore, advantageous to operate under conditions such that the direction of reflection of the light coincides with, or at least approaches, the direction of observation giving a faithful image of the luminous trace.

But, as a general rule, such a situation will not present itself except in the particular case in carrying out the invention with an oblique sweeping plane 8. This appears to be another reason to use an oblique plane, the obliqueness of which can be easily regulated in such a manner to place the axis 11 of the receptor 10 into the plane of reflection of the light.

Disregarding this particular case, the choice of the optimal position of the receptor 10 will result from a compromise between the visibility of the luminous trace 9 and the fidelity of its image received by the receptor 10.

Such a choice may be left to the expert in this field, which will make the choice as a function of the desired and necessary results.

As a nonrestrictive example, a series of tests carried out with a vertical sweeping plane 8 passing through the axis 15 at the mouth of the blast furnace (diametrical luminous trace 9) has shown that the optimal position of the receptor 10 corresponds to an angle of orientation ($\alpha$) of the axis 11 in the neighbor of 45°.

These tests have likewise shown that the limits of the angle $\alpha$, considering on the one hand the fidelity and on the other hand the visibility of the received image were respectively 10° and 80° approximately.

It will be understood that each of the elements described above, or two or more together, may also find a useful application in other types of apparatus to continuously determine the profile of a charge fed into a blast furnace.

While the invention has been illustrated and described as embodied in a process and apparatus to continuously determine the profile of a charge fed into a blast furnace, it is not intended to be limited to the details shown, since various modifications and structural changes may be made without departing in any way from the spirit of the present invention.

Thus, for instance, a turning mirror is not absolutely necessary. It may be replaced by a rotating luminous source, if the corresponding porthole is sufficiently dimensioned to permit the use of such a rotating luminous source with a sufficiently great amplitude to cover the total diameter of the mouth of the blast furnace at the elevation of the surface of the charges.

Furthermore, the invention is not limited to an axial sweeping plane but may be used also for different sweeping planes if the sweeping planes are vertical.

The light source may be constituted by a single incandescent lamp or, preferably, by a laser or any other appropriate light emitter. Care, however, has to be taken that the intensity of the emitted light beam will be sufficient, taking into consideration the weakening thereof due to the dust above the charge, and the receptor has to have the correct sensibility.

In this respect the receptor is not limited to a television camera, but may also be constituted by other means of observation capable to contain in its field of observation the totality of a diameter of the mouth of the blast furnace at the elevation of the surface of the charge.

Thus, it is possible to replace the television camera by a photodetector with a multiple of elementary cells, such as a system of photodiodes, or charge transfer cells commercially available, for instance, in France under the trade name "C.C.D."

What is claimed as new and desired to be protected by Letters Patent is set forth in the appended claims:

1. A process to continuously determine by optical means the profile of a charge fed into a blast furnace, comprising the steps of sweeping the surface of said charge in a plane intersecting the surface with a beam of light so as to produce at the intersection of said plane with the surface a luminous trace; observing said luminous trace from a point outside said sweeping plane; and determining on the basis of the data defining the sweeping plane, the observation point and the direction of observation with respect to the plane the true position of the points constituting said luminous trace.

2. A process as defined in claim 1, wherein said sweeping plane is a vertical plane.

3. A process as defined in claim 2, wherein said luminous trace is observed in a direction including with said sweeping plane an angle of between 15°–75°.

4. A process as defined in claim 2, wherein said luminous trace is observed from a point located in a plane normal to the sweeping plane and passing through the median region of said luminous trace.

* * * * *